INVENTOR
Harold N. Seyferth.
Ira J. Snader.
BY Harness, Dickey & Pierce
ATTORNEYS.

Patented May 5, 1942

2,281,719

UNITED STATES PATENT OFFICE 2,281,719

GRINDING WHEEL DRESSER

Harold N. Seyferth, East Detroit, and Ira J. Snader, Detroit, Mich., assignors to Ex-Cell-O Corporation, Detroit, Mich., a corporation of Michigan Application July 26, 1938, Serial No. 221,374

22 Claims. (Cl. 125—11)

The invention relates generally to grinding machines embodying a grinding wheel and it has particular relation to a dresser for dressing the surface of the wheel.

As a generality, it will be understood that grinding machines employing form grinding wheels are utilized to generate forms on different types of work. In particular, the present invention is concerned principally with thread grinding machines having grinding wheels designed to generate a thread on the work, and an important reason for using such machines is to obtain precision in the formation of the threads. During the use of such grinding wheels, wear on the grinding surfaces naturally occurs and it is customary to dress such surfaces by means of diamond dressing tools, so as to promote uniformity in precision obtained. Inasmuch as the dressing operation is not a work producing operation, it is important that the former be performed rapidly and with minimum interference with the work grinding operation so that the work producing capacity of the grinding machine will be as great as possible.

One of the principal objects of the invention is to provide a machine for dressing form generating surfaces of a grinding wheel which will enable dressing such surfaces in a minimum amount of time and with a high degree of precision.

Another object of the invention is to provide a dressing machine of the above identified character, having adjustment means of such character that the dressing tools may quickly and accurately be positioned.

Another object of the invention is to provide an improved machine for dressing a thread generating form on a grinding wheel which employs a pair of diamond dressing tools that are designed and arranged to dress respective grinding surfaces of the wheel.

Another object of the invention is to provide a dressing machine of the general type indicated wherein each of the diamond dressing tools, at the end of its particular dressing operation, is separated from the dressed surface and then is returned to its original position while being maintained in spaced relation to the dressed surface.

Another object of the invention is to provide a dressing machine such as mentioned, which is controlled and operated hydraulically.

Another object of the invention is to provide a form dressing machine which is so designed, constructed, and arranged that by means of a readily variable relation of parts, the machine may be used from dressing grinding wheels varying widely in form or contour.

Other objects of the invention will become apparent from the following specification, from the drawings relating thereto, and from the claims hereinafter set forth.

For a better understanding of the invention, reference may be had to the accompanying drawings, wherein.

Figure 1:
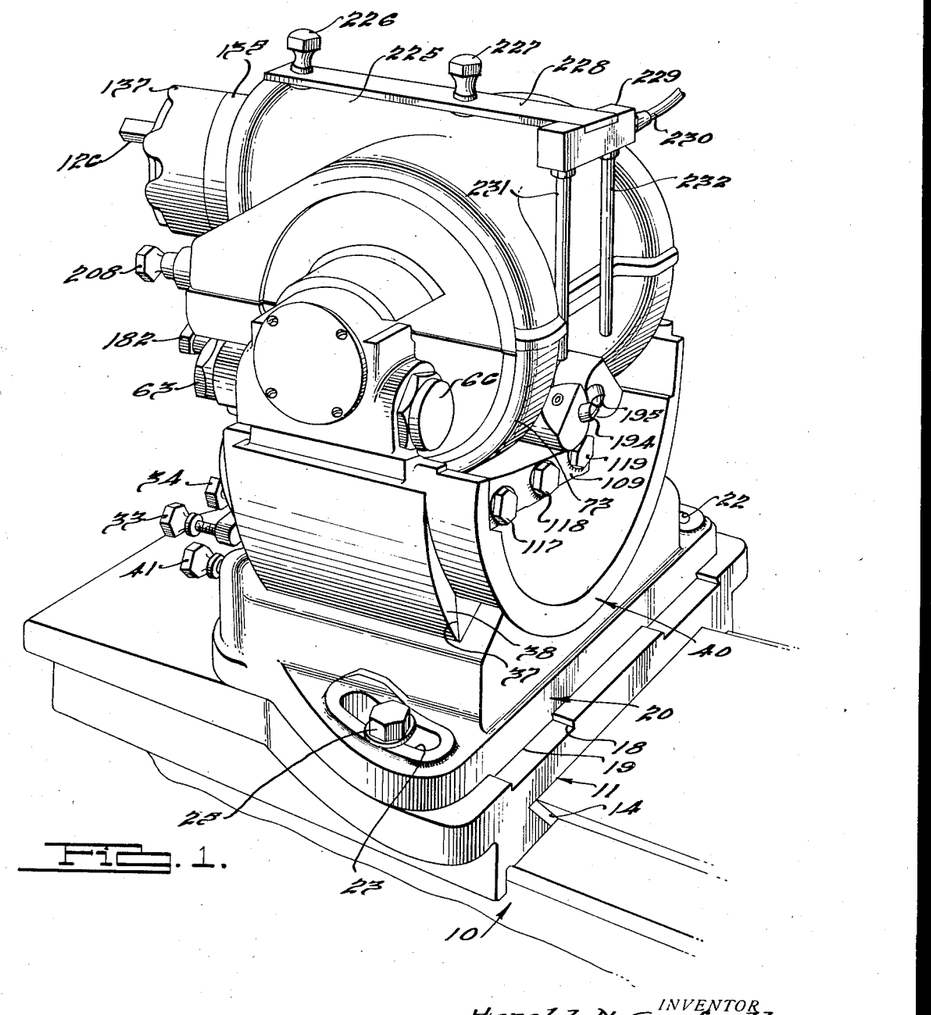
Figure 1 is a view in perspective of a thread dressing machine constructed according to one form of the invention.
Figure 2:
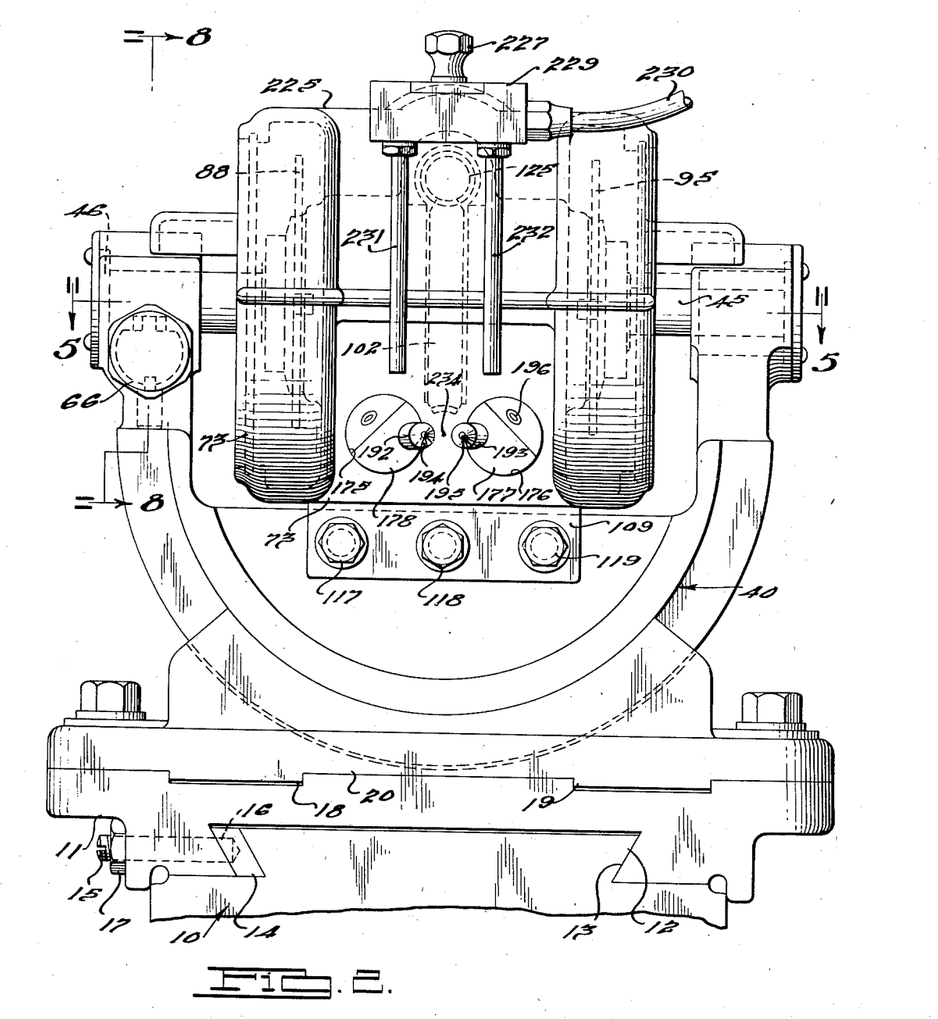
Fig. 2 is a front elevational view of the machine shown by Fig. 1.
Figure 3:
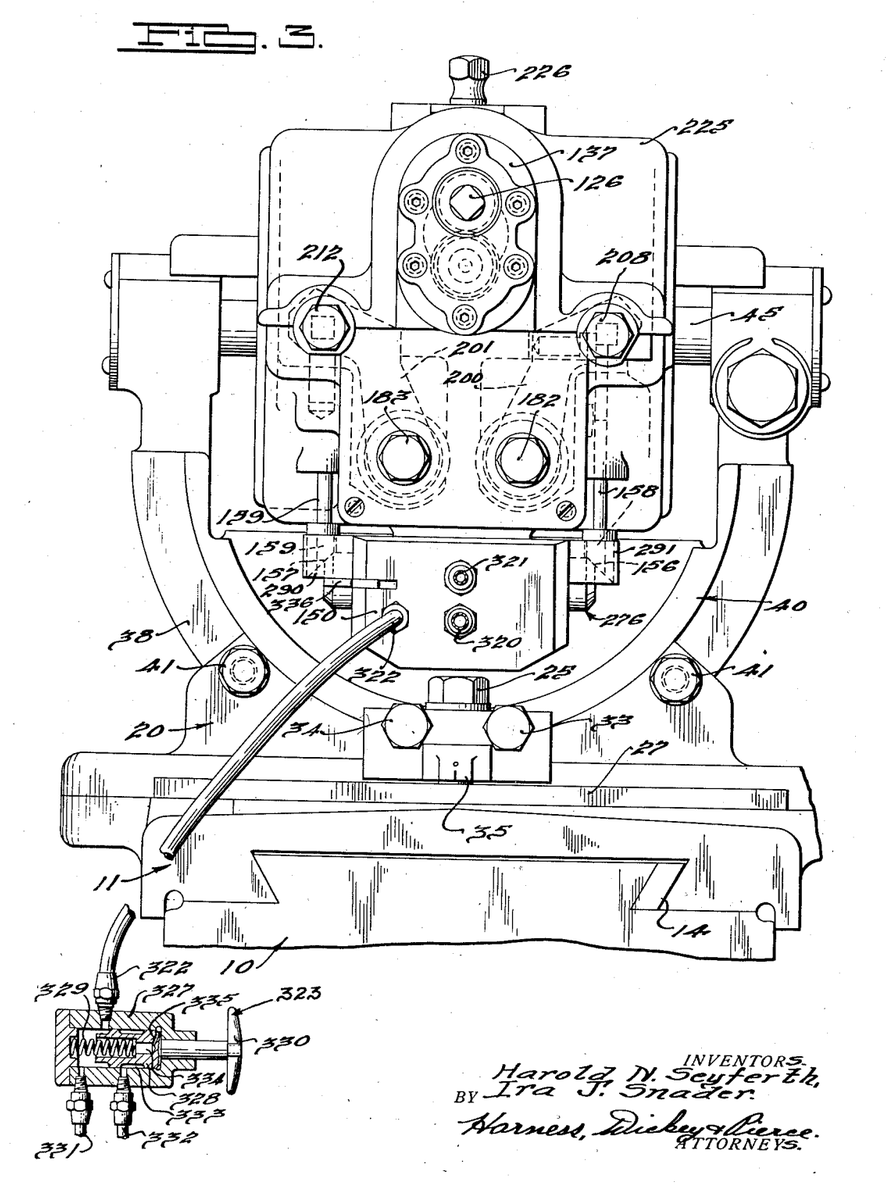
Fig. 3 is a rear elevational view of the machine shown by Fig. 1.

Referring to Figs. 1, 2, and 3, a fixed base portion of the grinding machine is indicated at 10 and the entire dresser shown by these figures is so mounted on this base portion that the grinding wheel may be brought into a proper position to be dressed in the manner hereinafter to be stated. A slide 11 is on the base 10 by means of a dovetail 12 and slot 13 receiving the dovetail and the slide may be adjustably fixed in position by means of a gib 14 at one side of the slot. This gib is adapted to be forced against one side of the dovetail by means of a screw 15 threaded through a portion of the slide and which has its inner end projecting into a non-threaded opening 16 in the bar. It is apparent that as the screw is tightened, the bar 14 is pressed frictionally against the side of the dovetail 12 so as to lock the base and slide together. A lock nut 17, on the outer end of the screw, locks the latter in position after the adjustment is made.

Figure 5:
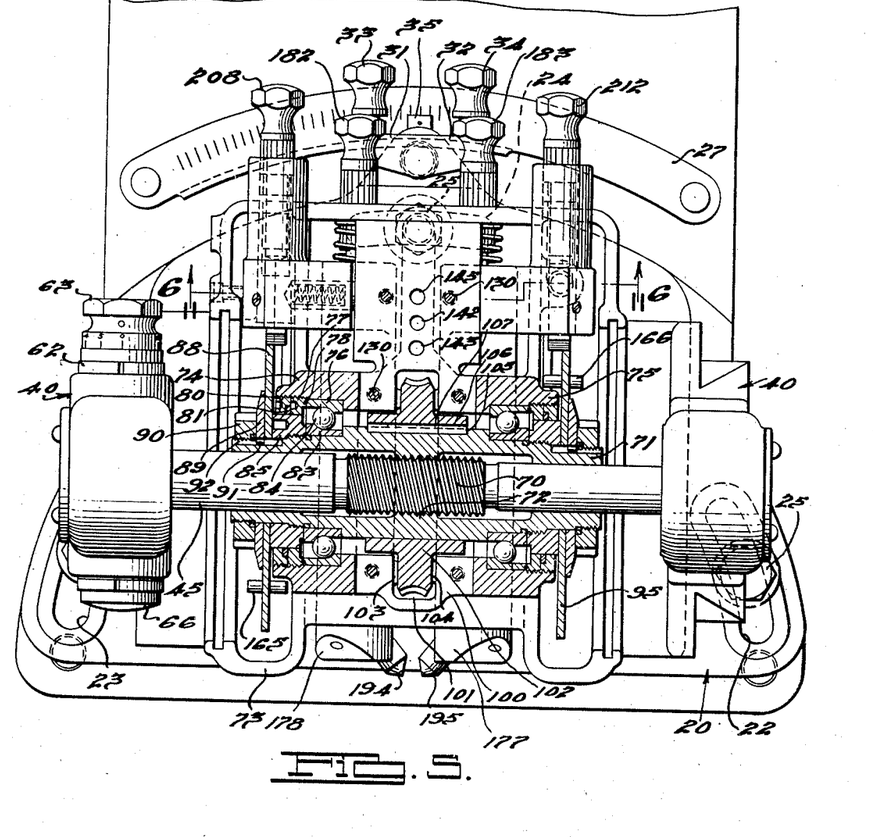
Fig. 5 is a cross-sectional view taken substantially along the line 5—5 of Fig. 2.

As shown by Figs. 1 and 2, the slide 11 has a concentric guideway 18 which receives a complementary guide 19 on a bracket swivel 20, and as shown by Figures 1 and 5, the base of this swivel has three spaced, arcuate slots 22, 23, and 24 that are concentric to the guideway. The swivel is adjustably secured to the slide 11 by means of bolts 25 projecting through the slots and threaded into the slide and by loosening the bolts slightly, the swivel may be swung about the center of the guideway and then by tightening the bolts, the swivel may be fixed in its new position.

Figure 4:
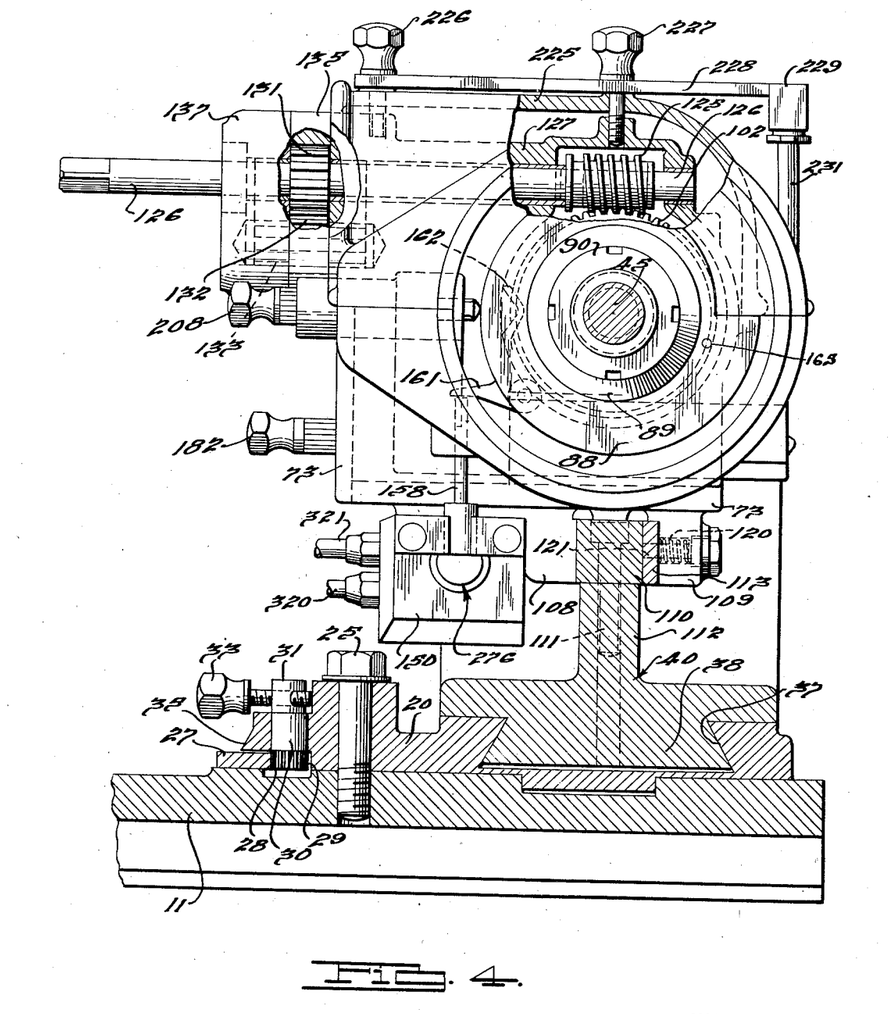
Fig. 4 is a side elevational view of the machine shown by Fig. 1, with certain parts shown in section.

In order to secure a fine adjustment of the swivel on the slide, an arcuate bar 27 is secured to the slide, as shown by Figs. 3, 4, and 5, and this bar, as shown by Fig. 4, has teeth 28 on its inner edge which are engageable with teeth 29 on a pin 30 journaled in an adjacent portion of the swivel. At its upper end, the pin 30 has wing portions 31 and 32 through which, respectively, screws 33 and 34 are threaded. As seen by Fig. 4, the inner ends of these pins are adapted to abut a side surface of the swivel and it will be apparent that by loosening one of the screws and tightening the other, the pin 30 will be turned accordingly. This will enable moving the swivel relative to the slide 11 owing to the engagement of the teeth 28 and 29. A fine degree of movement of the swivel may be obtained in this manner and the amount of movement may be indicated on bar 27 by employing a marker 35 on the swivel.

It will be understood that the bolts 25 must be loosened before adjusting the positions of the screws 33 and 34 to obtain the fine degree of movement, and ordinarily, the swivel will be so positioned that any movement desired can be accommodated by adjustment of the screws 33 and 34. Should a greater movement be desired, or should it be desired to change the position of the swivel substantially, the pin 30 may be withdrawn and then reinserted after moving the swivel approximately to its new position.

As shown best by Figures 1 and 4, the swivel 20 has an outwardly open and concentric guideway 37 and this guideway receives a similarly shaped dovetail 38 on a U-shape bracket 40. The bracket 40 may be adjustably locked in position relative to the swivel 20 by one or more screws 41 as shown by Figure 3, which are threaded through a side portion of the swivel and into the guideway 37, so as to frictionally engage at their inner ends one side of the dovetail 38. Thus, by loosening the screws slightly, the bracket may be adjustably swung in a vertical plane, and then locked in its new position by tightening the screws.

Figure 8:
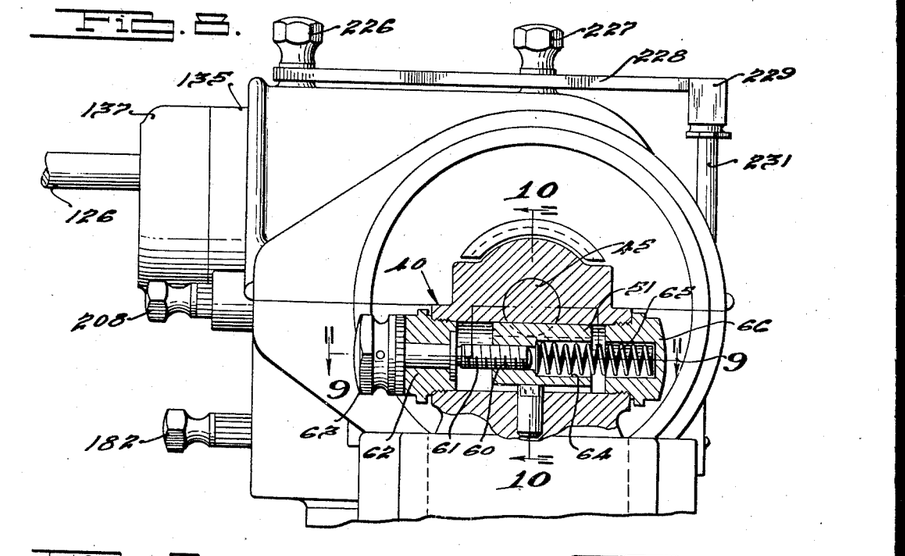
Fig. 8 is a cross-sectional view taken substantially along the line 8—8 of Fig. 2.
Figures 9, 10, 11:
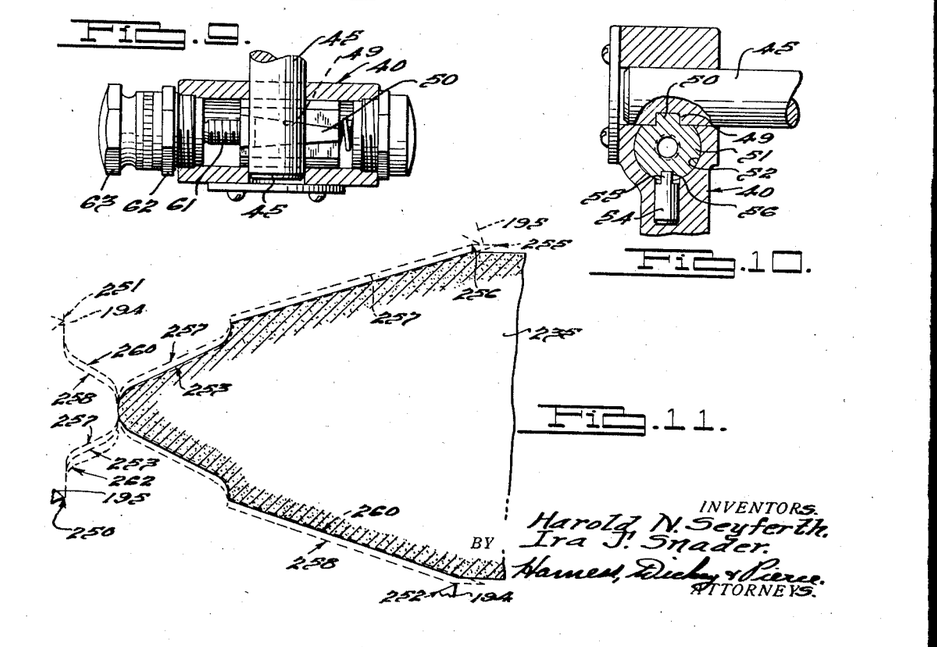
Fig. 9 is a cross-sectional view taken substantially along the line 9—9 of Fig. 8.
Fig. 10 is a cross-sectional view taken substantially along the line 10—10 of Fig. 8.
Fig. 11 is a fragmentary, sectional view of the outer peripheral portion of a thread grinding wheel, showing the manner in which the surfaces of the wheel are dressed during operation of the machine.

Now referring to Figures 2 and 5, in particular, it will be noted that a lead screw 45 extends between the ends of the bracket 40 and has its ends projecting into openings in such ends of the bracket. As shown by Figures 8, 9, and 10, one end of the screw at its under side has a wedge shape slot or groove 49 which receives a similarly shaped projection 50 on a sleeve 51 slidably mounted in an opening 52 in the adjacent end of the bracket. This arrangement prevents rotation of the lead screw about its own axis and it is also apparent that longitudinal movement of the lead screw will depend upon the position of the sleeve 51 along its own axis. If the sleeve is sufficiently moved in one direction, the projection 50 will completely fill the slot 49 in the screw and thus prevent any movement of the screw longitudinally of its axis while if the projection 50 and sleeve are moved in the other direction, the projection will move towards the larger end of the slot and thus create a space between the projection and the sides of the slot that will permit longitudinal movement of the screw. Rotation of the sleeve about its own axis is prevented by means of a key 54 having a projection 55 that projects into a groove 56 in the under side of the sleeve. It may be noted that the tapered sides of the slot 49 and the tapered sides of the wedge shape projection 50 are substantially symmetrical to the axis of the threaded pin 61 and from this it follows that if the screw 61 is adjusted to effect withdrawal movement of the projection from the slot, the space created between one tapered side of the projection and the adjacent tapered side of the slot will be substantially equal to the space created between the opposite tapered side of the projection and the tapered side of the slot adjacent thereto.

In order to adjust the position of the sleeve 51, it has a threaded opening 60 at one end and a threaded pin 61 is threaded into the opening. The pin at its outer end is journaled in a bushing 62 threaded into the bracket and the outer end of the pin is secured to a knob 63. At its opposite end the sleeve 51 has an opening 64, and a spring 65 seated in this opening and in an apertured cap 66 threaded into the opening in the bracket normally urges the sleeve 51 to the left, as seen in Fig. 8, so as to take up any looseness or play that may be present. When the knob 63 is turned, the sleeve is moved in one direction or the other, depending upon the direction the knob is turned, and movement of the sleeve, as previously stated, causes the wedge 50 to move in the slot 49 in the feed screw 45. The knob 63 has suitable graduated indicia thereon adapted to cooperate with a marker on the bushing 62 so that the permitted movement of the lead screw may be calibrated.

Now referring to Fig. 5, the lead screw 45 has an intermediate threaded portion 70 and a sleeve 71 is slidably mounted on opposite and smooth portions of the lead screw and has an internally threaded portion 72 at its center which engages the thread on the screw. The opposite ends of the sleeve have close but slidable bearing contact with the smooth portions of the screw and the threads on the screw and sleeve are formed accurately so as to obtain accurate movement when the sleeve is rotated. The sleeve 71 is rotatable in and carries a body 73 that is movable along the screw with the sleeve, but which is prevented from rotating therewith by means presently to be described. This body has ring portions 74 and 75 disposed around opposite end portions of the sleeve and since the parts arranged between each ring portion and the end of the sleeve are substantially the same, a detailed description of such parts at one end of the sleeve only seems to be sufficient. Referring to the left hand of the arrangement as seen in Fig. 5, the ring portion 74 carries an outer bearing race 76 which is held in position by means of a bearing nut 77 threaded into the ring and engaging the race. In order to obtain a completely circumferential contact between the nut and the race 76, a malleable ring 78, constructed of brass, for example, is disposed in a shallow groove in the nut 77 and between the latter and the bearing race. It is evident that the malleable character of the ring 78 will allow it to change in contour under pressure as the nut is threaded into the ring portion 74 and thus obtain a completely circumferential metal to metal contact between the nut and the bearing race. A second nut 80 is threaded into the ring portion and against the nut 77 and between such nuts, a sealing ring 81 may be provided to prevent the escape of lubricant that is provided in the bearing.

The sleeve 71 carries an inner bearing race 83 and between the two bearing races balls 84 are provided. The race 83 is held in position by means of a nut 85 threaded over to the sleeve 71. It will now be apparent that the sleeve 71 may turn in the body while at the same time being movable therewith axially of the lead screw.

Axially outward of the nut 85, a cam 88 is mounted on the end of the sleeve and this cam is maintained against the end of the nut by means of a friction disc 89 and a nut 90 threaded on the end of the sleeve. The friction disc 89 has a key 91 at one point which is slidable in a keyway 92 formed in the end of the sleeve, from which it follows that the friction disc is prevented from rotating relative to the sleeve 71. It may be mentioned that the cam 88 may be adjusted circumferentially upon loosening the nut 90. While the opposite end of the sleeve 71 and the ring portion 75 have similar elements assembled therewith, as described previously with respect to the other end of the sleeve, the cam on the right end of the sleeve has a different function as compared to the cam 88 and for this reason is identified by a different numeral 95.

Between the ring portions 74 and 75, the body 73 has a semi-circular portion 100, which is recessed as indicated at 101, for receiving a worm wheel 102 disposed on an intermediate portion of the sleeve 71. While the worm wheel 102 is rotatable relative to the body it is held against axial movement relative thereto by means of finished guide surfaces 103 and 104 slidably fitting opposite faces of the worm wheel. A driving connection is obtained between the worm wheel and the sleeve 71 by means of keyways 105 and 106 in the sleeve 71 and wheel, respectively, and a key 107 disposed in both keyways.

Now referring to Fig. 4, the body 73 at the lower side of the lead screw, is provided with spaced walls 108 and 109 that straddle a guide block 110 that is secured by bolts 111 to an upwardly projecting web 112 on the bracket 40. Between the guide block 110 and the wall 109, a bar 113 is provided which is adapted to be held against the guide block in such manner that a desired friction may be provided between the guide block and the bar.

As seen in Fig. 2, three screws 117, 118, and 119 are threaded into the wall 109 and viewing Fig. 4 in conjunction with Fig. 2, the screws 117 and 119 are relatively short and hold compression springs 120 against the bar 113. The intermediate screw 118 has a pilot 121 at its inner end which projects into an opening in the bar 113 so as to hold the latter relative to body 73 during movement of such body on the guide block while still permitting the bar to be pressed against the guide block by the springs. It will be appreciated that this spring pressure also results in the wall 108 being similarly pressed into frictional contact with the guide block 110. The purpose of this frictional resistance to movement of the body 73 along the guide block is to prevent movement of the body and associated mechanism along the axis of the lead screw until the latter will first have shifted longitudinally the amount, if any, allowed by the adjustment described in connection with Figs. 8, 9, and 10. As will be understood, the degree of frictional resistance necessary may be obtained by providing a suitable dimension of springs.

Considering the mechanism so far described, it will be apparent that if the worm wheel is rotated, the parts assembled on the lead screw will move longitudinally thereon after overcoming the friction between the bar 113, wall 108, and the guide block 110, it being understood that this frictional resistance is such that before any movement of the assembly along the lead screw axis occurs, the lead screw itself will move longitudinally the amount permitted by the adjustment described in connection with Figs. 8, 9, and 10. After the lead screw has moved this limited amount, then continued turning of the worm wheel will cause the assembly on the screw to travel along the latter, during which the frictional force pressing the bar against the block 110 is overcome.

Still referring to Fig. 4, the worm wheel 102 is adapted to be rotated by means of a worm 125 that is keyed to a shaft 126 journaled in a cap 127 which fits between the ring portions 74 and 75 of the body and which is secured to such body by means of screws 130 (shown in cross-section by Fig. 5). Shaft 126 is driven by a hydraulic motor comprising mating gears 131 and 132 on the shaft 126 and on an auxiliary shaft 133, respectively. It may be mentioned that the gears are disposed in openings in a spacer 135 located between the cap 127 and a bearing bracket 137, in which the outer ends of shafts 126 and 133 are journaled.

Figure 6:
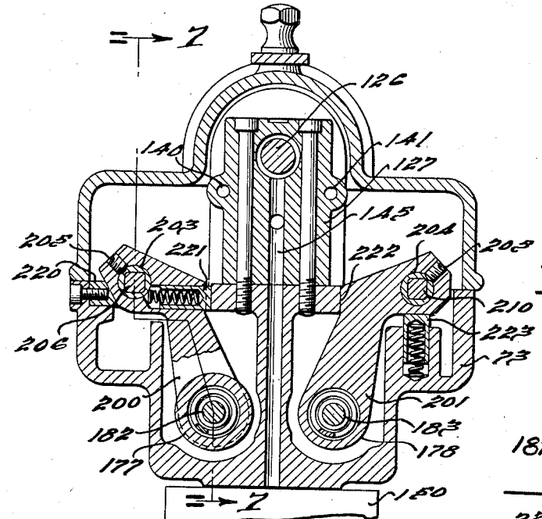
Fig. 6 is a cross-sectional view taken substantially along the line 6—6 of Fig. 5.

The hydraulic lines leading to the hydraulic motor and to opposite sides of the motor gears, respectively, are generally indicated at 140 and 141 in Fig. 6. It is to be understood that these lines or openings extend longitudinally in cap 127 and into the motor spacer 135, and while not shown, the openings or lines 140 and 141 are connected to vertical openings in cap 127 which join openings 142 and 143, respectively, in the body 73 as seen in Fig. 5. Any leakage of fluid in the motor and along the driven shafts drains through openings leading to various points where leakage may occur and such openings are connected to a drain line 145.

Referring to Figs. 4 and 5 jointly, the three openings 142, 143, and 145 all lead to a valve, generally indicated at 150, and it is to be understood that the drain line 145 is constantly connected to an exhaust port in the valve. The lines 142 and 143 alternately are pressure and exhaust lines so that when hydraulic fluid under pressure is connected to one line, the other line is open to exhaust and it follows that when one of the lines is connected to the fluid under pressure, the hydraulic motor will rotate in one direction and when the other line is connected to the fluid under pressure, the motor will rotate in the opposite direction. While the manner in which the mechanism is to be controlled by operation of the valve will presently be described, it is desired at this time to direct attention to the provision of plungers 158 and 159, as shown by Fig. 3, which have lower inclined faces 156 and 157 adapted to engage a plunger in the valve. These plungers 158 and 159 have their upper ends disposed in the path of movement of bell crank trips 161 pivotally mounted on the body 73 and which have ends 162, respectively, disposed in the path of movement of pins 165 and 166 on cams 88 and 95. These pins are circumferentially spaced so that one pin moves one trip while the other is substantially displaced from its trip.

Figure 7:
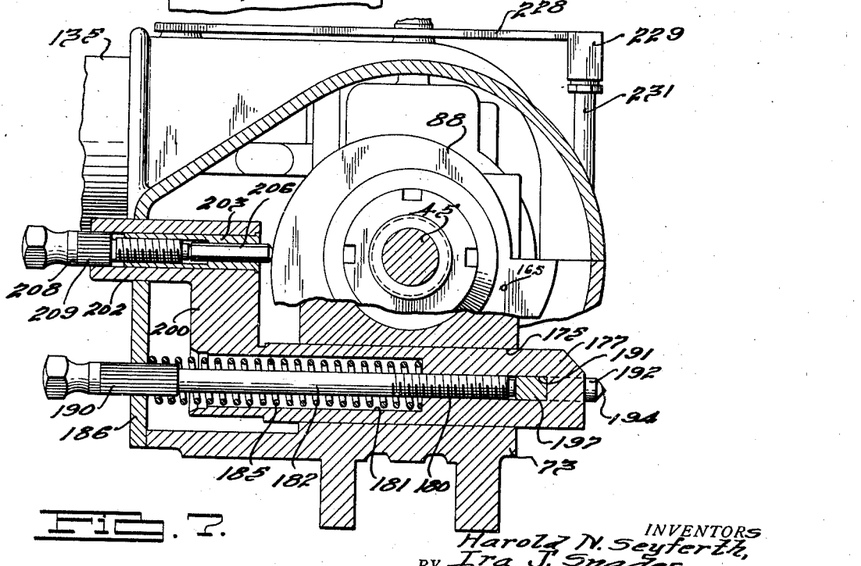
Fig. 7 is a cross-sectional view taken substantially along the line 7—7 of Fig. 6.

Now referring to Figs. 2, 6, and 7, it will be observed that the lower part of the body 73 has a pair of spaced openings 175 and 176 in which diamond carriers 177 and 178 are reciprocably mounted. Each of the carriers as shown by Fig. 7 has a threaded opening 180 and a spring receiving bore 181, and the openings, respectively, in the two carriers receive adjusting bolts 182 and 183 that are threaded into the openings 180. A spring 185 in each of the bores 181 abuts at one end a shoulder at the inner end of the bore 180 and at its other end a cover plate 186 secured to the body 73, and serves to constantly urge the carrier forwardly. The outer end of each of the bolts 182 and 183 passes through an opening in the plate 186 and is provided with graduated indicia 190 adapted to cooperate with a marker on the plate 186, so that turning movement of the bolts may be measured or calibrated.

Figure 15:
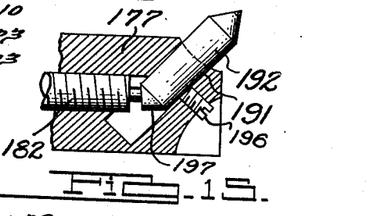
Fig. 15 is a detail view in section showing the mounting of the diamond holder and the manner of adjusting it.

At the forward end of each of the carriers as shown by Figs. 7 and 15, an angled opening 191 is provided and these openings, respectively, receive diamond holders 192 and 193 having pointed diamonds 194 and 195, respectively. A set screw 196 is used in conjunction with each of the carriers for holding the diamond carrier against turning about its own axis. Each of the diamond holders has an inclined, rear end face 197, against which the end of the cooperating adjustment bolt abuts, and from this it will be apparent that when the bolts 182 and 183 are turned, so as to move the bolts forwardly, the diamond holders will be advanced in the angled openings. Since the openings are angled toward each other, as best shown by Fig. 2, this adjustment of the bolts 182 and 183 will advance the diamond points along converging lines.

As shown by Figs. 6 and 7, the carriers 177 and 178, respectively, have offset arms 200 and 201 at their rear ends, and each of these terminates in a tubular portion 202 extending parallel to the bores 175 and 176. Bushings 203 and 204 are fitted in the tubular portions 202 and are fixed in position by means of set screws 205. Within the bushing 203, a cam follower 206 is reciprocably mounted and the forward end of this follower engages the peripheral face of the cam 88. A bolt 208 provided with graduations 209, threaded into the rear end of the bushing 203, serves to adjust the position of the cam follower with respect to the carrier 177.

Similarly, the bushing 204 carried by the arm 201 has a cam follower 210 which engages the peripheral face of the cam 95. A second bolt 212, shown by Fig. 5, is adjustably threaded into the bushing 204 so that the position of the cam follower 210 may be adjusted with respect to the carrier 178.

Again referring to Fig. 6 in particular, it will be observed that the carrier 177 is urged against a block 220 by means of a spring pressed plunger 221 and that this block 220 is to the left of the axis of bolt 182 in carrier 177. With respect to carrier 178, it will be noted that the arm 201 thereof is urged against a surface 222 by a spring pressed plunger 223. The reason for these spring pressed arrangements may be stated briefly as follows. It will be apparent that due to the offset relation of the cam followers 206 and 210 with respect to the carrier openings 175 and 176 in body 73, engagement of the two cams 88 and 95 with such cam followers will tend to turn the carriers 177 and 178 about the axes of such openings. As will be more evident hereinafter, diamond 194 is engaged with the grinding wheel when cam 88 is turning counterclockwise, as seen in Fig. 7, and hence the frictional engagement of the cam with the cam follower 206 tends to hold the arm 200 positively against the block 220, as seen in Fig. 6. Thus, a solid anchor is provided against altering the position of the diamond during its cutting operation. On the other hand, when the diamond 195 is cutting the grinding wheel, cam 95 is turning clockwise, and the frictional engagement of the cam with the cam follower 210 holds the arm 201 solidly against the surface 222.

As shown by Figs. 1 and 4, a cap or cover 225 is provided over the body 73, and this cover is held in position by bolts 226 and 227 threaded into cap 127. These bolts also secure a bar 228 in position that carries a block 229 which is apertured for the purpose of conducting coolant therethrough. A coolant inlet 230 communicates through the block with pipes 231 and 232 which extend to points adjacent the diamonds 194 and 195 so as to supply coolant to the diamonds and grinding wheel during the wheel dressing operation.

It may be pointed out in connection with Fig. 2 that adjustment of the bracket 40 on the bracket swivel 20 occurs about an axial center line indicated at 234, which is centered with respect to both diamonds 194 and 195 and thus adjustment of the bracket causes both diamonds to move about this axial center line. This adjustability, in conjunction with the adjustability of the bracket swivel and the slide 11, enables locating the diamonds in the desired positions.

Generally it will be realized that the path of movement of either of the diamonds is governed jointly by travel of the assembly along the lead screw, the shape of the controlling cam, and by the endwise movement of the lead screw. The latter movement will govern the path of movement of the diamonds in that the amount of such end movement of the lead screw will govern the time at which axial progression of the diamonds begins, and thus will determine the location of such paths laterally of the grinding wheel. Differently shaped cams may be employed and readily substituted one for another in order to obtain the desired radial movement of the diamonds and the pins on the cams for controlling operation of the motor may be varied in position depending on the results to be obtained. Moreover, the cams may be relatively displaced circumferentially as desired in order to vary the relation of movement of the diamonds. Again, the relation of axial movement to radial movement may be varied by using a lead screw arrangement with threads of a different pitch or combining this variation with variations in the cams.

In the construction as shown, the cams will not be turned through a complete turn as the pins will reverse or stop the motor before this occurs. Such pins are so related, however, and the cams are so arranged and shaped that as one diamond is moving toward the axis of the grinding wheel, the other is moving away from such axis. The general operation and the character of movement of the diamonds may best be understood in connection with Fig. 11, which shows a grinding wheel 235 and the two diamonds 194 and 195 diagrammatically. It may be mentioned before describing this operation that the shape of the cams necessary to obtain the desired movements of the diamonds may readily be obtained by those skilled in the art. Also, it may be stated that the dressing operation preferably is effected with the grinding wheel operating at the same high rate of speed as that used in the work grinding operation, as then the form is more accurately dressed and moreover, it is not changed such as might be caused by a change in centrifugal forces.

As seen in Figure 11, the two points 250 and 251 indicate, respectively, the initial positions of the diamonds 194 and 195, that is, the position of each diamond prior to the beginning of its wheel dressing movement. Assuming that the diamond 195 is at the starting point 250, the diamond 194 will be approximately in the position shown by full lines and indicated at 252. Assuming also that the lead screw is under an adjustment which permits certain endwise movement thereof before the mechanism thereon travels axially of the screw, the diamond 195 will not move until the screw is shifted endwise the amount permitted, as the cam 95 at this time engages its cam follower along a substantially circular portion of the cam. After the lead screw is shifted endwise, the diamond will travel axially of the lead screw until said circular portion of the cam passes its cam follower and then the diamond will travel inwardly towards the center of the grinding wheel along the path 253. The cam is of such character then that the diamond will follow the path 253 so as to dress the upper side of the wheel, as seen in this figure. When the diamond 195 reaches the end of its movement, indicated by the numeral 255, the hydraulic motor reverses and then the lead screw is shifted in the reverse direction the amount permitted. During shifting of the lead screw, rotation of the cam moves the diamond in a radial direction substantially to the point indicated at 256. When this point is reached, the mechanism carrying the diamond begins to move axially of the lead screw along the path indicated at 257, and in this connection it will be appreciated that the diamond is separated substantially from the surface of the wheel. While the diamond 195 is moving inwardly to dress the wheel in the manner mentioned, the diamond 194 is returning along its return path of movement, indicated at 258, and it will reach the position indicated at 251 at about the time the diamond 195 reaches the position indicated at 255. The line indicated at 260 shows the path of movement of diamond 194 during its wheel dressing movement and it will be understood that this movement occurs as diamond 195 is returning. Assuming now that the lead screw adjustment is changed so that a greater end movement of the screw is required before movement of the mechanism along the lead screw axis occurs, it will be apparent that the diamond 195, for example, will stay stationary for a longer period of time and therefore a larger circular portion of the cam will pass the cam follower, and from this it will be evident that the diamond will start moving inwardly along a different line such as the line indicated at 262. It follows that the entire path of movement of the diamond will shift laterally of the grinding wheel so as to correspond with the shift from line 253 to 262.

Likewise, the path of return movement 257 will shift laterally but it will be spaced farther from the path of dressing movement due to the greater radial movement at the beginning of the return movement. It follows that if the edge of the grinding wheel is narrower than desired, less endwise movement of the lead screw will be required, whereas if a wider edge on the grinding wheel is present, greater endwise shifting of the lead screw will be necessary. As a generality, therefore, it may be said that adjustability in shifting of the screw endwise enables bringing the two paths of dressing movement of the two diamonds closer together or moving them farther apart, as the case may be, without altering the contour of the paths of movement and while still causing the diamonds to be separated from the dressed surfaces of the wheel during return movement of the diamonds.

Since adjustment of the screw 61 and movement of the wedge 50 in the slot 49 creates a space between one tapered side of the projection and the adjacent tapered side of the slot which is substantially equal to the space at the opposite side of the projection, it follows that any adjustment of the wedge 50 effects shifting of both paths of movement of the diamonds axially of the grinding wheel depending upon the adjustment made. Moreover, this shifting of the two paths of movement effected by changing the position of the wedge 50 in the slot 49 is substantially equal but in opposite directions. In other words, during any variation of the relative locations of the two paths of movement of the tools axially of the wheel, such paths are automatically maintained substantially symmetrical to a substantially fixed median plane transverse to the wheel axis, so that the tools may be adjusted relative to a substantially fixed wheel center plane in dressing wheels having differently spaced side surfaces.

It may be mentioned that the wheel shown in Fig. 11 has two inclined surfaces radially inward of the thread form and, in causing the diamonds to travel along these inclined surfaces, the diamonds automatically are resharpened or reshaped to provide new cutting points. This feature is disclosed and claimed in the application for patent of William Locke, Serial No. 212,019, filed June 6, 1938. The present machine is adapted not only to take care of dressing of the wheel form and returning the diamonds in spaced relation to the dressed surfaces, but also to effect this reshaping of the diamonds.

In using the wheel dressing machine, normally the grinding wheel will be dressed at the end of an operation performed by the work grinding machine and it is desirable that operation of the dresser be so controlled as to enable the operator to change the work in the grinding machine while the wheel dressing operation is being effected. The means for controlling operation of the dresser will now be described but before making a detailed description it may be stated generally that the control means is to operate as follows. With the dresser at rest, and with the diamonds located in initial positions 250 and 252 as seen in Fig. 11, the dresser is started by moving a manual control and then it continues its operation automatically until the diamonds return to their initial positions where the dresser is stopped automatically. Thus, the operator need only move the manual control initially.

Figure 12:
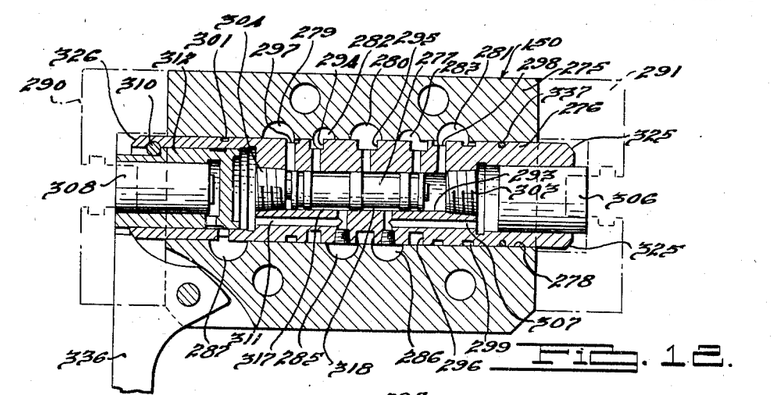
Figs. 12, 13, and 14 are sectional views of the valve employed for controlling operation of the machine.

Now directing attention to Fig. 12, the valve 150 comprises a body 275, a main operating plunger 276 and an auxiliary plunger 277 within the main plunger. The bore in the body which slidably receives the plunger 276 is indicated at 278 and this bore has three exhaust ports 279, 280 and 281, two pressure ports 282 and 283, two motor line ports 285 and 286 and a pressure port 287 adapted to be temporarily connected to a pressure line. Plates 290 and 291 shown in broken lines for the purposes of clarity and which are bolted to the ends of the body 275 serve as stops for plunger 276 and also provide guides for the operating plungers 158 and 159 described previously.

The plunger 276 has a bore 293 receiving the auxiliary plunger 277 and at its outer surface plunger 276 also has three principal grooves 294, 295 and 296, two pilot line grooves 297 and 298, a drain groove 299 and a starting line groove 301. Grooves 294 to and including groove 298 are connected by radial openings respectively to the bore 293. Plugs 303 and 304 threaded into the ends of plunger 276 provide end stops for plunger 277 as well as closures for the ends of the plunger. At the right, a plunger 306 is slidable in the end of plunger 276 and the space at the inner end of plunger 306 is connected by an opening 307 to the bore 293 near the center of the latter. At the left end, a tubular plunger 312 having an inner end wall is slidable in the end of plunger 276, and a second plunger 308 is slidable in plunger 312. A pin 310 passing through the wall of plunger 276 limits outward movement of plunger 312 relative to plunger 276. The space at the inner end of plunger 312 is connected to bore 293 by an opening 311 and the space between the inner ends of plungers 308 and 312 is in communication with the starting pressure line 287. It may be added here that plates 290 and 291 also serve as stops to limit outward movement of plungers 308 and 306, respectively. Grooves 317 and 318 are provided in plunger 277 for a purpose which will be understood hereinafter.

Pressure ports 282 and 283 are connected by passages not shown to a hydraulic line indicated at 320 in Fig. 3, exhaust ports 279, 280 and 281 are connected to an exhaust line 321, while the starting line port 287 is connected to a line 322. Line 322 as also shown by Fig. 3, extends to a remote control valve 323 which is operable manually. The valve includes a body 327 having a plunger 328 slidable therein and such plunger normally is urged to the right by a spring 329 but is adapted to be moved against the spring by an external, hand control member 330. An exhaust line 331 connected to the body 327 normally is in communication with line 322 through the valve from which it follows that port 287 normally is open to exhaust. A hydraulic line 332 leading to the valve is adapted to be placed in communication with line 322 when the plunger is moved to the left, by a groove 333 in the plunger, it being evident that the plunger when so moved to the left cuts off line 322 from line 331. It may be noted that both ends of the plunger are open to exhaust at all times by means of an opening 334 extending axially of the plunger and smaller openings 335 at the right end of the former. The size of openings 335 may be such if desired, to slightly retard spring return of plunger 318 so as to hold port 287 in communication with line 332 for a short length of time after hand pressure on the member 330 is released.

Motor line ports 285 and 286 respectively are connected to the lines 143 and 142 leading to opposite sides of the hydraulic motor, and with the parts in position as shown in Fig. 12, both ports 285 and 286 are connected with the exhaust groove 295 and, therefore, the motor is stopped and there is no chance of it being moved slightly by any leakage of fluid under pressure to either port. When it is desired to start the cyclic operation, the valve 323 (Fig. 3) is operated and this temporarily admits fluid under pressure to the interior of plunger 312 and this causes the latter to shift to the right. At this time, fluid under pressure is present beyond the inner end of plunger 312 and thus the fluid therein acts as a hydraulic column, resulting in movement of plunger 276 along with plunger 312. This movement connects pressure line 282 and groove 294 to the motor port 285 and connects motor port 286 to exhaust groove 295 and exhaust port 280. The motor thus is caused to rotate in one direction.

Figure 13:
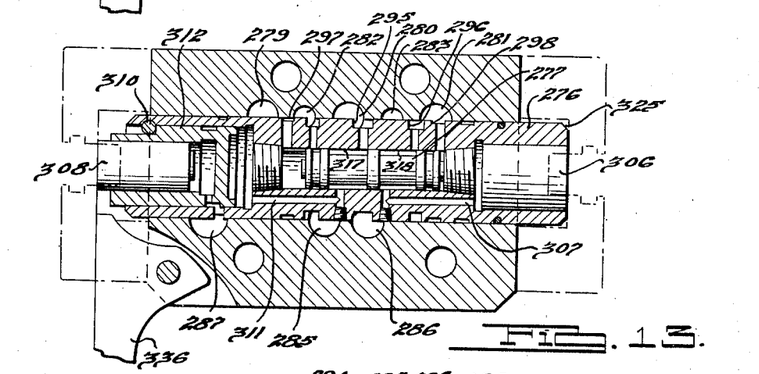

When plunger 276 has moved to the right end position as shown by Fig. 13, pressure port 282 opens slightly to groove 297, and pressure is supplied to the left end of auxiliary plunger 277 while the right end thereof is open to exhaust port 281. Auxiliary plunger 277 is thus shifted to the right and when so shifted, the space at the right end of plunger 312 is connected by opening 311 and grooves 317 and 295 to exhaust port 280.

After the motor rotates sufficiently, plunger 158 is caused to move downwardly by movement of cam 88, and the inclined surface 156 thereon (Fig. 3) engaging a chamfer 325 on the right end of plunger 276, shifts the latter slightly to the left and enough to connect pressure port 283 with groove 296 and hence space 318 and opening 307, thereby connecting the space at the inner end of plunger 306 with the fluid pressure line. This results in a shift of plunger 276 to the left to the position shown in Fig. 14, which in turn connects pressure port 283 to groove 296 and motor line 286, and exhaust port 280 to groove 295 and motor line port 285. This causes reversal of the motor.

Figure 14:
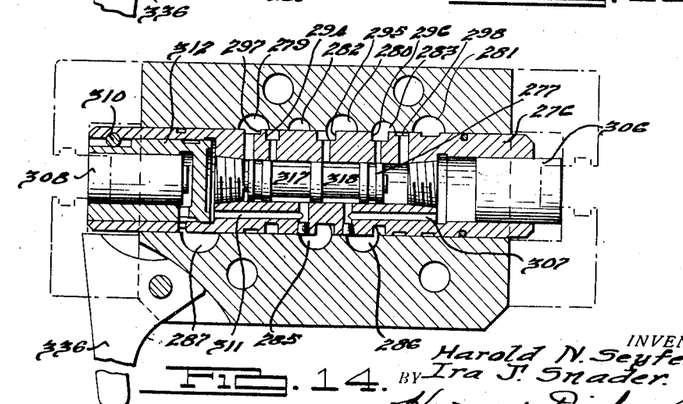

At the end of the left hand movement of plunger 276, pressure port 283 is opened slightly to groove 298 and fluid pressure is thus supplied to the right end of plunger 277 while the left end of the latter is connected to exhaust. Thus auxiliary plunger 277 is shifted to the left and when so shifted, the space at the inner end of plunger 306 is connected by opening 307 and grooves 318 and 295 to exhaust port 280.

When the motor has reversely rotated sufficiently, cam 95 effects downward movement of plunger 159 which in turn engages a chamfer 326 on plunger 276 and shifts the latter slightly to the right sufficiently to open pressure port 282 to groove 294 and opening 311, thus supplying fluid under pressure to the right end of plunger 312. This will force plunger 276 to the right until pin 310 engages the shoulder on plunger 312 and then the parts will stop in position. This brings the parts to the positions shown by Fig. 12.

Starting of the cycle may be re-initiated by operating valve 323, or a manual trigger 336 may be used to shift plunger 276 the initial amount. At both of the end positions of plunger 276, the spaces between its right end and plunger 306, and its left end and plunger 312 are open to exhaust and the plunger is held in position by friction only. For this reason the plunger is shiftable by a relatively small force which is normally advantageous for actuating purposes. In some installations however, where small exhaust lines are used, the exhaust pressure may be considerable and in view of the difference in areas at such ends of the plunger, may be sufficient to shift the plunger at the improper time. For this reason the desired friction is introduced by a split wire ring 337 which creates enough resistance to movement of plunger 276 that the back pressure will not move the plunger.

While the valve is shown in detail, it is to be understood that such valve per se is not a part of the present invention. Electrical controls might be employed to secure the particular cyclic operation mentioned—that is manual start, automatic reversal of the motor, and then stopping of the motor at its initial position. It may be added that a metering valve might be used in the fluid pressure line to vary motor speed.

Although only one form of the invention has been illustrated and described in detail, it will be apparent to those skilled in the art that various modifications may be made without departing from the scope of the appended claims.

What is claimed is:

1. In combination, a frame, a non-rotatable screw means mounted in the frame, means permitting limited shifting of the screw means along its axis, rotary feed screw means movable along and engaging the first screw means, a tool holder movable along said axis with the rotary screw means when the latter is rotated, means for reversing the rotation of said rotary screw means after a predetermined movement thereof along said axis so as to reverse the movement thereof along said axis, and means for effecting an axial shifting of said first screw means within the limits permitted when rotation of the rotary screw means is reversed.

2. In combination, a frame, non-rotatable screw means mounted in the frame, means permitting limited shifting of the screw means along its axis, rotary feed screw means movable along and engaging the first screw means, a tool holder movable along said axis with the rotary screw means when the latter is rotated, means for reversing the rotation of said rotary screw means after a predetermined movement thereof along said axis so as to reverse the movement thereof along said axis, means for effecting an axial shifting of said first screw means within the limits permitted, when rotation of the rotary screw means is reversed and means for adjusting the limits of permitted shifting movement of the first screw means.

3. In combination, a frame, a lead screw mounted in the frame and having a threaded portion, an internally threaded sleeve on and having threaded engagement with the threaded portion of the screw, motor driven means for rotating the sleeve so as to cause movement of the latter along the screw, a tool holder movable towards and from the axis of the screw, means including a cam turned by the sleeve for moving the tool holder as the sleeve moves along the screw, and means for controlling operation of the motor driven means including a control element on the cam.

4. In combination, a frame, a non-rotatable screw mounted in the frame and having a threaded portion, means permitting limited movement of the screw along its axis, an internally threaded and rotary sleeve on the screw and having threaded engagement with the threaded portion of the latter, a tool holder, means effecting movement of the holder with the sleeve along the screw when the sleeve is rotated, cam means rotated by the sleeve for moving the holder towards and from the axis of the screw, reversible means for rotating the sleeve, and means for automatically causing a shifting of the screw along its axis within the limits permitted when rotation of the sleeve is reversed.

5. In combination, a frame, a non-rotatable screw mounted in the frame and having a threaded portion, means permitting limited movement of the screw along its axis, an internally threaded and rotary sleeve on the screw and having threaded engagement with the threaded portion of the latter, a tool holder, means effecting movement of the holder with the sleeve along the screw when the sleeve is rotated, cam means rotated by the sleeve for moving the holder towards and from the axis of the screw, reversible means for rotating the sleeve, and means sufficiently resisting movement of the sleeve along said screw as to cause a shifting of the screw the limited amount permitted before movement of the sleeve along the axis can occur.

6. A dressing machine for dressing a grinding wheel, comprising a frame, a lead screw non-rotatably mounted in the frame and having a threaded portion and smooth portions at opposite ends of the threaded portion, a sleeve on the screw and having an internally threaded portion engaging the thread on the lead screw and having end bearing portions slidably fitting the smooth end portions of the screw, means for rotating the sleeve, a tool holder, and means operatively connected to the sleeve for moving the tool holder towards and from the axis of the screw as the sleeve travels axially on the latter.

7. In combination, a bracket having spaced arms, a non-rotatable lead screw having its ends engaging the arms respectively, a threaded sleeve on the screw, means for turning the sleeve, a tool support carried by the sleeve, and cooperating means on the support and on the bracket for preventing turning of the support when the sleeve is rotated.

8. In combination, a bracket, a threaded member carried by the bracket, a second member having threaded engagement with the first member, means for holding one of said members against rotation, means for rotating the other member, a tool carrying support carried by the rotatable member, means for preventing rotation of the support with the rotatable member while allowing its axial movement with the rotatable member, and adjustable means providing for variable resistance to axial movement of the support.

9. In combination, a bracket, a threaded member carried by the bracket, a second member having threaded engagement with the first member, means for holding one of said members against rotation, means for rotating the other member, a tool carrying support carried by the rotatable member, means for preventing rotation of the support with the rotatable member while allowing its axial movement with the rotatable member, means allowing predetermined endwise movement of the non-rotatable member, and adjustable means providing for adjustable resistance to axial movement of the support to enable securing endwise movement of the non-rotatable member when the rotatable member is reversely rotated.

10. A dressing machine for dressing a grinding wheel which is rotated adjacent the dresser, which comprises rotary lead screw means disposed parallel to the axis of the wheel, a dressing tool carrier, non-rotatable means movable along the screw axis and by the rotary screw means and carrying the tool carrier, spring means constantly urging the tool carrier towards the wheel axis, and a cam rotatable by the screw means for governing movement of the carrier by the spring means.

11. A dresser for dressing a grinding wheel comprising a support having an opening, a reciprocatory diamond carrier disposed in said opening, an arm on said carrier, a cam follower on said arm, a rotary cam on the support in offset relation to the center line of said opening and engaging said follower, and a bearing slidably engaging said arm so as to anchor said carrier against turning in a predetermined direction when the cam is turning in a direction normally tending to move the carrier in said predetermined direction.

12. A dresser for dressing a grinding wheel comprising a support having an opening, a reciprocatory diamond carrier disposed in said opening, an arm on said carrier, a cam follower on said arm, a rotary cam on the support in offset relation to the center line of said opening and engaging said follower, a bearing slidably engaging said arm so as to anchor said carrier against turning in a predetermined direction when the cam is turning in a direction normally tending to move the carrier in said predetermined direction, and resilient means urging movement of said carrier in said predetermined direction.

13. In a dresser for dressing a grinding wheel, a bracket, a lead screw mounted in said bracket, and adjustable means permitting endwise movement of the screw in the bracket, said means comprising a wedge shaped slot in the screw, a similarly shaped wedge on the bracket and projecting into the slot and adjustable means for moving the wedge along the slot.

14. In combination, a bracket, a non-rotatable lead screw on the support, an internally threaded and rotatable sleeve on the lead screw, a tool support mounted on the sleeve for movement therewith axially of the screw, means for preventing rotation of the screw while permitting its axial movement with the sleeve, a tool controlling cam carried by the sleeve and rotatable therewith, and a movable tool holder carried by the support and controlled by said cam.

15. In combination, a bracket, a non-rotatable lead screw on the support, an internally threaded and rotatable sleeve on the lead screw, a tool support mounted on the sleeve for movement therewith axially of the screw, means for preventing rotation of the screw while permitting its axial movement with the sleeve, a tool controlling cam carried by the sleeve and rotatable therewith, a movable tool holder carried by the support and controlled by the cam, and means enabling circumferential adjustment of the cam on the sleeve.

16. A dressing machine for dressing a grinding wheel which is rotated adjacent the dresser, comprising a dressing tool carrier, spring means for moving the carrier towards the wheel axis, a rotary cam for controlling the movement of the carrier by the spring during the wheel dressing operation and for withdrawing the carrier against the action of the spring after the dressing operation is completed, means for moving the carrier axially of the wheel during the wheel dressing operation, and means automatically effecting simultaneous operation of the last means and the rotary cam.

17. A dressing machine for dressing a rotary grinding wheel having its outer peripheral portion substantially V shape, comprising a pair of dressing tools, a support for each tool, means effective to advance one tool and its support inwardly towards the grinding wheel axis and along one side surface of the V shape peripheral portion to effect dressing of said side surface, means effective to move the other tool and its support inwardly towards the wheel axis and along the other side surface of the V shape peripheral portion to effect dressing of such other side surface, and a single adjustable means for varying the relative locations of the two paths of movement of the two tools so that grinding wheels having variably spaced side surfaces may be dressed, said adjustable means being so constructed and arranged that adjustment effects shifting of both paths of movement either towards or away from each other axially of the grinding wheel depending upon the adjustment made.

18. A dressing machine for dressing a rotary grinding wheel having its outer peripheral portion substantially V shape, comprising a pair of dressing tools, a support for each tool, means effective to advance one tool and its support inwardly towards the grinding wheel axis and along one side surface of the V shape peripheral portion to effect dressing of said side surface, means effective to move the other tool and its support inwardly towards the wheel axis and along the other side surface of the V shape peripheral portion to effect dressing of such other side surface, and adjustable means for varying the relative locations of the two paths of movement of the tools axially of the wheel while automatically maintaining the paths substantially symmetrical to a substantially fixed median plane transverse to the wheel axis so that the tools may be adjusted relative to a substantially fixed wheel center plane in dressing wheels having differently spaced side surfaces.

19. A dressing machine for dressing a rotary grinding wheel having its outer peripheral portion substantially V shape for thread grinding purposes, which comprises a pair of dressing tools, a support for each tool, means effective to move one tool and its support axially of the wheel and then inwardly towards the grinding wheel axis and along one side surface of the V shape peripheral portion to effect dressing of said side surface, means effective to move the other tool and its support along the wheel axis and then inwardly towards the wheel axis and along the other side surface of the V shape peripheral portion to effect dressing of such other side surface, and adjustable means for varying the relative axial locations of the inward portions of the two paths of movement of the tools while maintaining them substantially symmetrical to a median wheel center plane transverse to the wheel axis so that the tools may be adjusted relative to a substantially fixed wheel center plane in dressing wheels having differently spaced side surfaces.

20. A dressing machine for dressing a rotary grinding wheel having its outer peripheral portion substantially V shape for thread grinding purposes, which comprises a pair of dressing tools, a support for each tool, means effective to move one tool and its support axially of the wheel and then inwardly towards the grinding wheel axis and along one side surface of the V shape peripheral portion to effect dressing of said side surface, means effective to move the other tool and its support along the wheel axis and then inwardly toward the wheel axis and along the other side surface of the V shape peripheral portion to effect dressing of such other side surface, and adjustable means for modifying both paths of movement of the tools while automatically maintaining the paths substantially symmetrical to a substantially fixed center plane directed radially of the wheel axis.

21. A dressing machine for dressing a rotary grinding wheel having its outer peripheral portion substantially V shape, comprising a pair of dressing tools, a support for each tool, means effective to advance one tool and its support inwardly toward the grinding wheel axis and along one side surface of the V shape peripheral portion to effect dressing of said side surface, means effective to move the other tool and its support inwardly toward the wheel axis and along the other side surface of the V shape peripheral portion to effect dressing of such other side surface, and adjustable means for modifying both paths of movement of the tools while automatically maintaining the paths substantially symmetrical to a substantially fixed center plane directed radially of the wheel axis.

22. A dressing machine for dressing a rotary grinding wheel having its outer peripheral portion substantially V shape, comprising a pair of dressing tools, a support for each tool, means effective to advance one tool and its support inwardly towards the grinding wheel axis and along one side surface of the V shape peripheral portion to effect dressing of said side surface, means effective to move the other tool and its support inwardly towards the wheel axis and along the other side surface of the V shape peripheral portion to effect dressing of such other side surface, and a single adjustable means for automatically varying the two paths of movement of the tools while maintaining such paths substantially symmetrical to a predetermined plane directed transversely to the wheel axis.

HAROLD N. SEYFERTH.
IRA J. SNADER.